United States Patent [19]
Fulton

[11] Patent Number: 5,866,966
[45] Date of Patent: Feb. 2, 1999

[54] STATOR FOR AN ELECTRICAL MACHINE INCLUDING RETAINER FOR STATOR COILS

[75] Inventor: Norman Neilson Fulton, Leeds, England

[73] Assignee: Switched Reluctance Drives Limited, Harrogate, England

[21] Appl. No.: 814,413

[22] Filed: Mar. 11, 1997

[30] Foreign Application Priority Data

Mar. 13, 1996 [GB] United Kingdom .................... 9605265

[51] Int. Cl.[6] ............................. H02K 3/46; H02K 3/487
[52] U.S. Cl. ............................ 310/214; 310/216; 310/260
[58] Field of Search .................................. 310/214, 215, 310/216, 254, 258, 201, 260, 270; 29/606, 199; 336/199, 210, 197

[56] References Cited

U.S. PATENT DOCUMENTS

| | | | |
|---|---|---|---|
| 1,796,422 | 3/1931 | Apple ...................................... | 310/201 |
| 2,465,820 | 3/1949 | Sharrow et al. ......................... | 171/206 |
| 3,093,764 | 6/1963 | King et al. .............................. | 310/214 |
| 4,330,726 | 5/1982 | Albright et al. ......................... | 310/254 |
| 4,345,175 | 8/1982 | Jones ........................................ | 310/45 |
| 4,894,573 | 1/1990 | Simpson .................................. | 210/217 |
| 4,990,810 | 2/1991 | Newhouse ............................... | 310/194 |

FOREIGN PATENT DOCUMENTS

| | | |
|---|---|---|
| EP 0 414 507 A1 | 2/1991 | European Pat. Off. . |
| 699685 | 12/1940 | Germany ............................... 310/214 |
| 1285924 | 8/1972 | United Kingdom ................... 310/214 |
| 2055253 | 2/1981 | United Kingdom ................... 310/214 |
| WO 92/10021 | 6/1992 | WIPO ..................................... 310/214 |

OTHER PUBLICATIONS translation of Ziegler(German Patent Application 699,685), Dec. 4, 1940.

*Primary Examiner*—Nestor Ramirez
*Assistant Examiner*—Karl Eizo Tamai
*Attorney, Agent, or Firm*—Patterson & Keough, P.A.

[57] ABSTRACT

An electrical machine such as a switched reluctance motor includes a stator including a stator body, a plurality of poles each having an energizing coil, and a rotor. Portions of the coils are retained in channels between adjacent poles and by a wedge tied at each end to projections extending from the stator body. The manner of retaining the wedge avoids disturbance of the flux linkage in the stator poles and allows improved locating and retaining of the coils in the channels between stator poles.

9 Claims, 4 Drawing Sheets

5,866,966

STATOR FOR AN ELECTRICAL MACHINE INCLUDING RETAINER FOR STATOR COILS

BACKGROUND OF THE INVENTION

1. Field of the Invention

The invention relates to an apparatus for retaining a winding on the stator of an electrical machine and in particular a reluctance machine.

2. Description of Related Art

Switched reluctance machines are well known. Such machines comprise a generally cylindrical stator and, rotatably mounted therein, a rotor. The stator includes a plurality of inwardly directed poles extending the axial length of the stator. Typically, each pole has an energizing coil, the coils being connected in some predetermined pattern to form the stator winding. Adjacent poles define an axially extending slot or channel in which the coil side is retained. The rotor comprises a plurality of radially outwardly projecting poles. When used as a machine, the stator is excited by passing a current through the winding in sequence as the rotor rotates relative to the stator.

A problem that has arisen with known arrangements is that of holding the winding securely in place. If the winding is loose, then it may foul the rotor and cause damage. If the winding is able to vibrate, then it may, over a period of time, abrade the insulation surrounding it and give rise to an insulation failure. The larger the machine, the more difficult it is to secure the windings, since they are heavier and the electromagnetic forces acting on them are greater. If the coils are not firmly held in place against the side of the pole and against the base of the slots formed between the poles, the thermal transfer between the coil and the stator is poor and the ability of the winding to dissipate heat is impaired. This can restrict the output from the machine. In the larger sizes of machines, the copper conductors are of substantial cross section and are not easily forced into place. Any small variations in the coils can make it difficult to insert them fully into the slots and ensure that they are firmly held in place.

In some forms of electrical machine, the slots between the poles of the stator are open, making access straightforward. However, the fact that the slots are open also means that the coils have to be secured in place. It is known to insert slot covers across the mouth of the slot but, unless notches are provided in the sides of the adjacent poles, it is difficult to prevent the slot covers from slipping out into the bore of the stator and fouling the rotor. While notches are sometimes acceptable in small machines, their presence in larger machines causes a disturbance in the flux path which can lead to excessive losses. In addition, because the notches are necessarily small, the dimensions of the slot cover must be carefully controlled to ensure the covers fit correctly.

A further known approach to securing the winding in place is to impregnate the winding with suitable electrically insulating and thermally conducting thermosetting or otherwise curable material, and to locate accurately the winding while the material sets. The preferred method is vacuum pressure impregnation (VPI). This approach is complex and time-consuming and is not suitable for mass production.

A further known approach has been to provide a floating ring of insulating material such as TUFNOL brand synthetic resin-bonded fabric around the exterior of the stator and to hold the coils in place using loops extending between the floating ring and portions of each coil extending beyond each axial end of the stator. Once again this approach is very laborious and time-consuming, and difficult to mechanize.

A further problem is encountered when initially inserting the coils into the slots in the stator. One method of inserting the coils is to rotate the stator until a pole to be wound is at the bottom and then to mount a pre-wound coil over the pole, tapping it into place. Once one coil is mounted, the stator is rotated until the next pole is at the bottom. Tapping of a subsequently fitted coil onto the next pole, however, tends to loosen or even dislodge other coils already in place. Further problems arise when pressure is applied to one axial end of the coil at a time, in which case, as a result of the natural resilience of the coil, the other axial end of the coil will have a tendency to spring out of position.

SUMMARY OF THE INVENTION

It is an object of the invention to provide an arrangement which avoids or mitigates the problems found in the prior art.

It is a further object of the invention to provide an arrangement allowing secure retention of a winding on a stator of a electrical machine.

It is yet a further object of the invention to provide an arrangement allowing improved and simplified mounting of a coil on the pole of a stator of an electrical machine.

According to embodiments of the invention, there is provided a stator for an electrical machine, comprising a stator body and at least two stator poles projecting from the body and defining a channel between them, the stator further comprising at least one coil having a coil side in the channel and a retainer including a retainer member arranged against the surface of the coil and secured to the stator body to urge the coil into the channel. The term "coil side" is known in the art as meaning the portion of the coil running along the side of the poles and thus in the channel between adjacent poles. Because this retainer member is secured to the stator body rather than the pole, the flux path in the pole is not disturbed. The retainer further may include a tie securing the retainer member to the stator body. The retainer member is thus quickly and easily secured.

The retainer member may be secured to projections at each axial end of the stator body, and preferably the projections from the stator body project from the axial end of an interpolar projection projecting between adjacent poles on the stator and extending the axial length of the stator. Any effects on the flux path in the stator body are then minimized.

The retainer member may extend substantially the axial length of the stator and the tie may pass through an axial hole running the length of the retainer member.

Alternatively, a further projection may extend from each axial end of the retainer member and a respective tie may pass around each further projection.

The retainer may comprise two retainer members urging respective axial ends of the winding into the channel and the tie may run through axial holes in both of the retainer members.

The retainer member may include coil-contacting surfaces profiled to urge a coil in a substantially radial direction.

Embodiments of the invention further comprise a retainer for a stator as herein described, the retainer including a retainer member for urging a stator coil into a channel between poles and a tie for tying the retainer to projections at each axial end of the stator.

Embodiments of the invention further comprise a reluctance motor including a stator as herein described.

According to embodiments of this invention there is further provided a method of mounting coils on the poles projecting from the stator body of a stator for an electrical machine in which coils are placed over adjacent poles, a retainer member is fitted over the coils in a channel between adjacent poles and the retainer member is secured to the stator body to urge the coil into the channel. The retainer member preferably has projections at each axial end, a tie is preferably tied around both of the retainer member and stator projections at each axial end and the ties are preferably individually tightened to urge the coils into place. The coils can thus be retained in place to a desired degree of pressure.

BRIEF DESCRIPTION OF THE DRAWINGS

The present invention can be put into practice in various ways some of which will now be described by way of example with reference to the accompanying drawings in which.

DETAILED DESCRIPTION OF PREFERRED EMBODIMENTS

Figure 1:
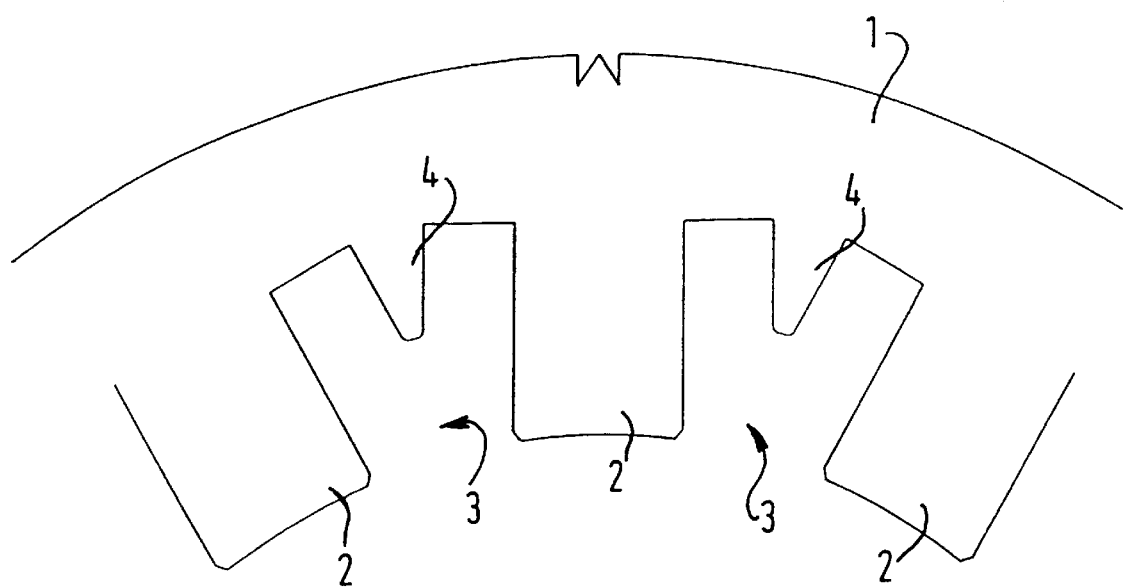
FIG. 1 is a partial sectional view of a known stator.
Figure 2A:
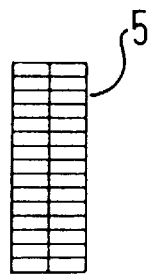
FIGS. 2a–2d show various known coil cross sections.
Figure 2B:
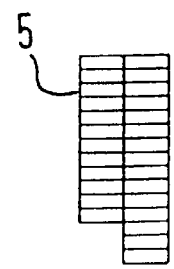
Figure 2C:
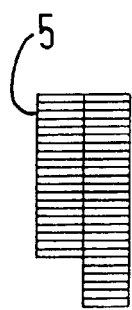
Figure 2D:

FIG. 1 shows a portion of the cross-sectional view of a known type of reluctance motor stator 1. The stator 1 includes a stator body and, extending therefrom, a plurality of poles 2 projecting inwardly and equiangularly spaced around the stator 1. The stator 1 is elongate and cylindrical, the view in FIG. 1 being a cross-section taken perpendicular to the longitudinal axis of the stator 1. The poles 2 run the entire axial length of the stator 1, parallel to the longitudinal axis. Adjacent poles 2 define between them channels or slots 3 also running the axial length of the stator 1. The slots 3 are open at a radially innermost end relative to the stator 1. The particular type of stator 1 shown in FIG. 1 is described in more detail and forms the subject matter of European Patent No. EP-A-414507, which is incorporated herein by reference. As can be seen, the stator further includes interpolar projections 4. As described fully in the above-referenced patent, these projections 4 allow reduced thermal resistance between the coil and the lamination from which the stator 1 is formed, the advantages of which outweigh the comparatively small disturbance of the flux path caused by the projections 4.

Figure 3:
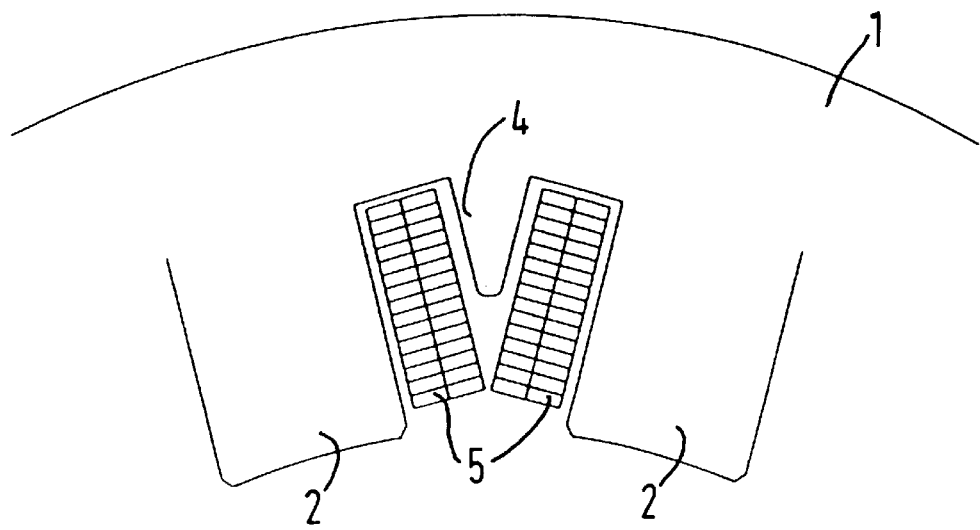
FIG. 3 is a partial sectional view of a wound stator.

Coils are provided around each pole of the stator 1 to allow operation of the motor. FIG. 2 shows a selection of different coil profiles 5, all of which could be used with the lamination of FIG. 1. It will be observed that they may consist of many or few conductors and the layers may have unequal numbers of conductors. FIG. 3 shows part of a typical winding inserted into the slots 3 of the stator lamination 1 shown in FIG. 1. It will be appreciated that each coil 5 is placed around a pole 2 and extends along both sides for their entire axial length and around the axial ends of the pole 2. Accordingly the coils 5 shown in FIG. 3 each comprise half of a coil around a respective pole 2, the other half extending on the other side of the pole 2 not being shown. It will be seen that unless appropriate steps are taken the coils 5 will have a tendency at least to work loose and vibrate.

Figure 4:
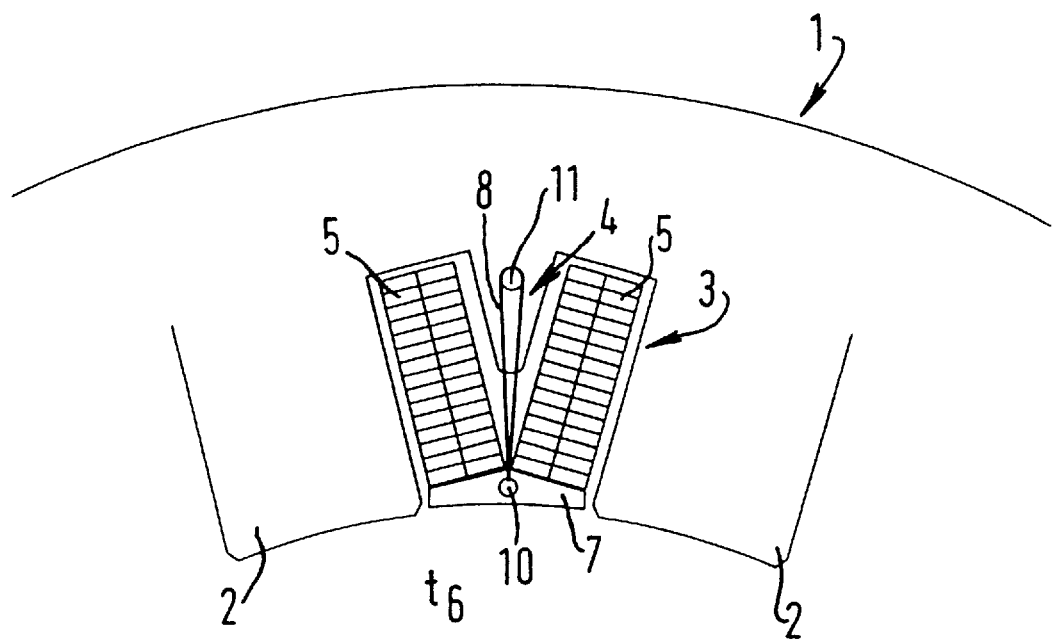
FIG. 4 is a partial sectional view of a wound stator and retainer in accordance with embodiments of the present invention.
Figures 5A, 5B:
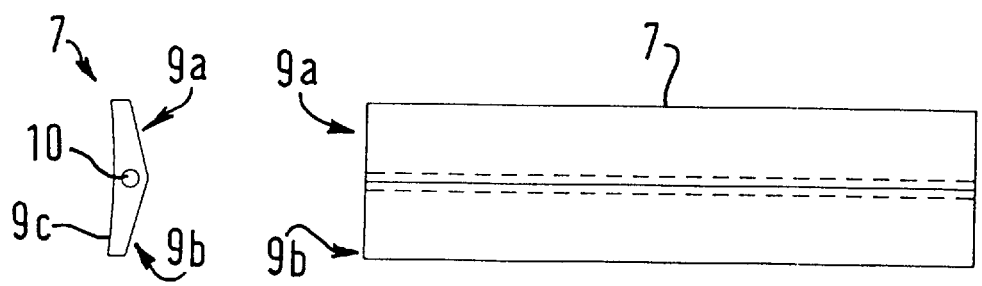
FIG. 5a is a top view of a retainer member in accordance with embodiments of the present invention.
FIG. 5b is a side view of a retainer member in accordance with the present invention.

Referring now to FIG. 4, the solution proposed according to embodiments of the present invention is shown. A retainer shown generally as 6 is inserted at the radially innermost open end of the slot 3 to retain the coils 5 in position. The retainer comprises a retainer member, namely a wedge 7, and a tie 8. The wedge 7 can be seen in more detail from FIGS. 5a and 5b. The wedge 7 comprises an elongate element of suitable width to fit within the slot 3 and of substantially the same length as the axial length of the slot 3 and stator 1. The wedge 7 has a lower face 9c which points radially inwardly when it is positioned in the slot 3. The lower face 9c has an arcuate profile when viewed in cross-section perpendicular to the longitudinal axis, having approximately the same radius of curvature as that of the inwardly facing surfaces of the stator poles 2. The arcuate lower face of the wedge 7 is thus profiled to clear the rotor and present a substantially smooth radially inner surface. The wedge 7 has an upper surface which points into the slot and contacts the coils 5. The upper surface of the wedge 7 includes two faces 9a, 9b angled towards one another and meeting at the longitudinal center of the upper surface, at which point the wedge has its greatest depth. The angled faces 9a, 9b are profiled so as to fit against the coils and to urge them against the stator in a substantially radial direction.

Preferably the wedge is made of a non-ferromagnetic, non-conducting material which is easily machined or molded to shape, for example a synthetic resin bonded fabric or an epoxy glass compound. Such a material will be well-known to those of ordinary skill in the art. One possible material is TUFNOL brand synthetic resin-bonded fabric.

The wedge 7 includes a hole 10 running centrally and axially along its length. As discussed in more detail below, the tie 8 is threaded through the hole 10 having looped portions extending at either end of the wedge 7. The tie 8 can be made from any suitable insulating material and appropriate materials are well known in the construction of electrical machines.

A pin 11 is mounted in a hole formed in each end of the interpolar projection 4. As the hole runs the axial length of the interpolar projection 4, the pin 11 may be inserted all the way through the hole or, preferably, a shorter pin may be inserted as an interference fit at each end. The pin 11 preferably has a shoulder to control the depth of insertion into the interpolar projection 4. The pin 11 is also preferably non-ferromagnetic and non-conducting, but if necessary a metallic pin may be used in order that the pin is suitably strong. Alternatively this pin may be substituted by an integral projection in certain types of electrical machines, although this arrangement does not lend itself to the laminated structure of a reluctance machine stator. Because the interpolar projection 4 has limited effect on the flux path in the stator, the addition of the pin is not detrimental to the actual operation of the machine, while introducing the advantages set out above.

The wedge 7 is tightly held in place in the slot 3 against the coils 5 by the tie 8. The loops at each end of the tie loop around the pin 11 and are held thereon by a head on the pin (not shown). The wedge 7 is tightened into place by tightening the tie 8. Because the two angled faces 9a, 9b of wedge 7 are profiled as discussed above, the coils 5 are forced into their desired position in the slots 3 when the wedge 7 is fitted into the slot.

It will be appreciated that if a coil 5 having an irregular face (see for example coil profiles b, c, and d in FIG. 2) is used, for example because the final layer of conductors in the winding is incomplete, the main face of the wedge 7 can be profiled accordingly.

Because of the provision of the wedge 7 and the tie 8, the coils 5 can be simply and securely held in place. There is no need to cut notches into the poles 2 to hold the wedge 7 in place. Because the wedge 7 runs the axial length of the slot 3, it will exert pressure along the whole coil and uniformly urge it into the required position. In addition, as other wedges 7 are inserted in their respective slots 3, coils 5 already held in place by a wedge 7 will not be dislodged.

Figure 8:
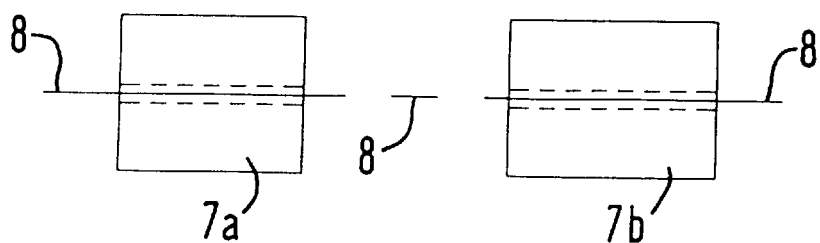
FIG. 8 shows another embodiment of the invention.

FIG. 8 shows an alternative embodiment of the invention in which a pair of axially shortened wedges 7a, 7b are provided for inserting at opposing axial ends of the slot 3. A hole 10a, 10b runs centrally and axially through each wedge and the tie 8 runs through each hole and across the space in between. This embodiment still allows secure retaining of the coils 5 in the slot 3, and in particular will exert pressure on the axial ends of the coils, if this is preferred. The embodiment has the advantage that it is no longer necessary to thread the tie 8 through a long wedge; instead the tie 8 is simply threaded through the holes 10a, 10b in each of the comparatively short wedges 7a, 7b.

Figure 6:
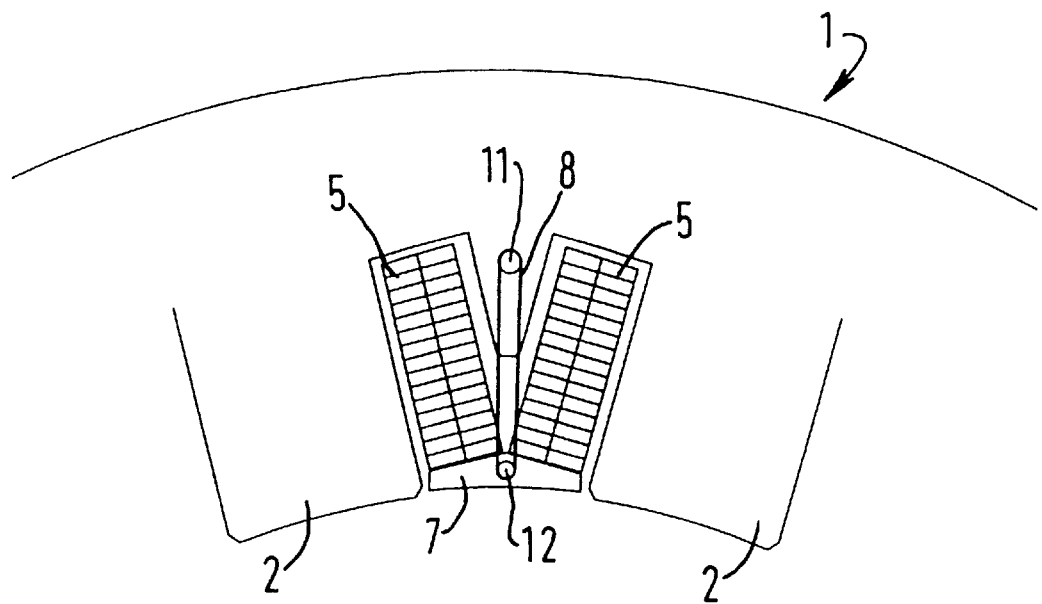
FIG. 6 is a partial sectional view of a wound stator and retainer in accordance with another aspect of the present invention.
Figures 7A, 7B:
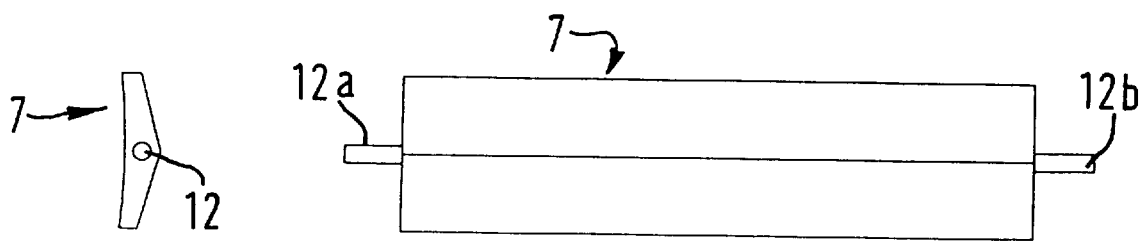
FIG. 7a is a top view of the retainer member of FIG. 6.
FIG. 7b is a side view of the retainer member of FIG. 6.

In a further alternative embodiment shown in FIGS. 6, 7a and 7b, the wedge 7, which is of a length substantially equal to the axial length of the stator 1, has protrusions 12 in the form of two protruding parts 12a, 12b extending from its axial ends. The protruding parts 12a, 12b can be either integral parts of the wedge 7, in which case the axial hole 10 is not required, or can be one long pin or two short ones inserted in the hole 10 in the wedge. Two ties 8 are provided for securing the respective ends of the wedge 7. The ties 8 pass around the pins 11 protruding from the interpolar projection 4 and the parts 12a or 12b protruding from the ends of the wedge 7. Because independent ties 8 are provided, the wedge 7 can be bound in place by successively tightening each tie 8 in iterative steps until the desired position and pressure is attained. The arrangement thus allows a particularly effective manner of positioning and retaining the coils 5.

It will be appreciated that various modifications can be made. For example, a pin 11 protruding from the interpolar projection 4 can be replaced by a pin or other projection protruding from the main part of the stator body 1, either axially from an end face of the stator body or radially from the outer surface of the stator body preferably near the axial end.

It will further be appreciated by the skilled person that, while the invention is described in relation to rotary machines, it is equally applicable to linear reluctance machines. While the invention has been described in connection with the illustrative embodiments discussed above, those skilled in the art will recognize that many variations may be made without departing from the present invention. For example, the present invention is applicable to inverted machines in which the stator is in the center of the machine and the rotor is arranged to rotate around the outside of the stator. Accordingly, the above description of several embodiments is made by way of example and not for the purposes of limitation. The present invention is intended to be limited only by the scope of the following claims.

What is claimed is:

1. A stator for an electrical machine, the stator comprising:
   a stator body having axial ends;
   at least two stator poles projecting from the stator body, the stator poles defining a channel between them;
   an interpolar projection in each channel, the interpolar projection having axial ends and first projections at the axial ends of the interpolar projection;
   at least two coils each having a coil side in the same channel and a coil surface facing out of the channel, the interpolar projection projecting between the coil sides in the channel on the stator; and
   a retainer, the retainer including a retainer member arranged against the coil surfaces of both coil sides and tied to the first projections from the interpolar projection to urge both of the coil sides into the channel to either side of the interpolar projection.

2. The stator of claim 1, wherein the retainer further includes a tie securing the retainer member to each first projection.

3. The stator of claim 1, wherein the retainer member extends substantially the axial length of the stator.

4. The stator of claim 3, wherein the retainer member defines an axial hole running the length of the retainer member, the stator further comprising a tie passing through the axial hole and secured to the first projections.

5. The stator of claim 3, further comprising second projections extending from the axial ends of the retainer member; and
   a respective tie passing around each second projection.

6. The stator of claim 1, wherein the retainer comprises two retainer members urging respective axial ends of both of the coils into the channel, the retainer members defining axially aligned axial holes, the stator further comprising a tie running through the axial holes in the two retainer members.

7. The stator of claim 1, wherein the retainer member includes coil-contacting surfaces profiled to urge the coil sides in a substantially radial direction.

8. A reluctance motor, the reluctance motor comprising the stator of claim 1.

9. A stator for an electrical machine, the stator comprising:
   a stator body;
   at least two stator poles projecting from the stator body, the stator poles defining a channel between them;
   at least two coils each having a coil side in the same channel and a coil surface facing out of the channel;
   interpolar projections projecting between the coil sides in the channel on the stator, the interpolar projections having axial ends;
   retainer means for urging both of the coil sides into the channel, the retainer means including a retainer member arranged against the surfaces of both coil sides and secured to the stator body;
   first projection means for extending from axial ends of the stator body, the first projection means extending the axial length of the stator and projecting from the axial ends of the interpolar projections;
   second projection means for extending from axial ends of the retainer means; and
   means for connecting the first projection means and the second projection means, the connecting means urging both coil sides into place in the channel.

\* \* \* \* \*